US006738680B2

(12) United States Patent
Nesbitt

(10) Patent No.: US 6,738,680 B2
(45) Date of Patent: May 18, 2004

(54) METHOD FOR PROVIDING DIMENSIONALLY CORRECTED AND FUNCTIONALLY ENHANCED PARTS TO MANUFACTURERS

(75) Inventor: Bruce M. Nesbitt, Chicago, IL (US)

(73) Assignee: Dimension Bond Corporation, Chicago, IL (US)

(*) Notice: Subject to any disclaimer, the term of this patent is extended or adjusted under 35 U.S.C. 154(b) by 443 days.

(21) Appl. No.: 09/725,586

(22) Filed: Nov. 29, 2000

(65) Prior Publication Data

US 2002/0065742 A1 May 30, 2002

Related U.S. Application Data

(60) Provisional application No. 60/171,964, filed on Dec. 23, 1999.

(51) Int. Cl.[7] .............................................. G06F 19/00
(52) U.S. Cl. ............................. 700/97; 700/90; 700/99
(58) Field of Search .............................. 700/90, 97, 99, 700/106, 108, 28; 705/80, 26

(56) References Cited

U.S. PATENT DOCUMENTS 6,064,982 A * 5/2000 Puri ............................ 705/27
6,173,210 B1 * 1/2001 Bjornson et al. ............ 700/99
6,177,942 B1 * 1/2001 Keong et al. ............... 345/810

OTHER PUBLICATIONS

Functional Coating Properties Guide published by Orion Industries, Ltd. in 1999.
Standard Terms and Conditions of Sale published by Orion Industries, Ltd., no date.
Description of Known Coating Techniques Offered to Customers Such as Part Manufacturers published by Dimension Bond Corporation, no date.

* cited by examiner

Primary Examiner—Jayprakash N. Gandhi
(74) Attorney, Agent, or Firm—Bell, Boyd & Lloyd LLC

(57) ABSTRACT

The present invention discloses a method for providing dimensionally corrected and functionally enhanced parts to a manufacturer. The method comprises offering the manufacturer a plurality of options for dimensionally correcting and functionally enhancing the raw parts. The options include the option to select what the raw parts to alter from a population of raw parts provided by the manufacturer, the option to select the portions or surfaces of each raw part to be dimensionally corrected and functionally enhanced, and the option to select at least one material to be applied as a correcting or enhancing material. After the options are selected by the manufacturer, the enhancing material is applied to the selected portion(s) of the selected raw parts in accordance with the individually selected options forming the dimensionally corrected and functionally enhanced parts. The dimensionally corrected and functionally enhanced parts are provided to the manufacturers or other entity designated by the manufacturer.

21 Claims, 7 Drawing Sheets

METHOD FOR PROVIDING DIMENSIONALLY CORRECTED AND FUNCTIONALLY ENHANCED PARTS TO MANUFACTURERS

CROSS-REFERENCE TO RELATED APPLICATION

This application claims the benefit of U.S. Provisional Application No. 60/171,964, filed Dec. 23, 1999.

DESCRIPTION

The present invention relates in general to a method for providing dimensionally corrected and functionally enhanced parts to manufacturers, and in particular to a method for enabling manufacturers to select from a plurality of options as to the materials and methods used in dimensionally correcting and functionally enhancing the parts.

BACKGROUND OF THE INVENTION

Millions of parts for machines, equipment, devices, apparatus and products are manufactured or machined every day around the world. Such parts are made out of metals, plastics and a variety of other materials. People have developed and refined various manufacturing methods for producing such parts. However, despite the continued advancements in the manufacturing and machining arts, mass manufacturing machine processes are generally not one hundred percent accurate. The specifications for such parts therefore incorporate tolerances (i.e., the desired dimension plus or minus some acceptable amount) as is well understood in the art.

For example, the manufacturer of a bushing may include in the bushing specifications an aperture having a diameter of 0.50+/−0.005 inches. This means that the diameter of the aperture of the bushing must be anywhere between 0.495 inches to 0.505 inches to be within specifications and acceptable to the end user of the bushing. If the diameter of the aperture of the bushing is not within these specifications, the bushing cannot be used without correction.

During the typical manufacturing processes, there is a statistically normal dimensional distribution of parts around a specified value as illustrated by the bell curve in FIG. 1. This bell curve represents the normal dimensional distribution of parts around the desired value, where DOTS (i.e., dimensional optimum target specification) represents the desired value, LSL (i.e., lower specification limit) represents a first or lower dimensional limit and USL (i.e., upper specification limit) represents a second or upper dimensional limit. If the bell curve represented the distribution of bushings in the example provided above, DOTS would represent the desired aperture diameter of 0.50 inches, LSL would represent a first dimensional limit defined as bushings having an aperture diameter of 0.495 inches (i.e., 0.50 inches− 0.005 inches) and USL would represent the second dimensional limit defined as the bushing having an aperture diameter of 0.505 inches (i.e., 0.50 inches plus 0.005 inches). Any parts which have an aperture diameter less than the first dimensional limit LSL or exceeding the second dimensional limit USL cannot be used without correction. Those parts which have an aperture diameter that fall within the range defined by dimensional limits LSL and USL are generally usable by the manufacturer in this example.

Those parts that fall outside the range defined by dimensional limits LSL and USL are out of range, out of specification and are not usable without dimensional correction. Ordinarily, this means that these parts must either be salvaged (if possible) or discarded by the manufacturer. Generally, if the part having a dimension smaller than the LSL is going to be salvaged or further processed, the part must be dimensionally enlarged, further machined, honed, reamed or ballsized (i.e., making the aperture diameter larger and closer to the DOTS). It has been well known to, and manufacturers often, dimensionally change a part with a coating. However, the process of making an aperture of a part smaller is generally expensive and time-consuming and therefore not readily undertaken by manufacturers.

The manufacturing process is often complicated because the part, a surface of the part or an aperture in the part may need to have a functionally enhanced surface and still remain within the specifications. The functionally enhanced surface may be a low friction surface provided by a coating, lining, bonded material, lubricant, sealing, or other similar material such as a fluoropolymer such as PTFE (Teflon®), referred to herein for brevity as enhancing functional material (as opposed to painting or plating). The enhanced surface may also be a high friction surface provided by an adhesive or other bonded material.

Current technology only enables these parts to be measured after the added material is cured, rigid or firm. Conventional wet film thickness testing gauges tend to damage the material in a measuring process because they puncture the material while it is wet. Thus, a manufacturer may produce, through conventional spray coating, thousands of parts during a run, only to find upon final inspection that they are out-of-range, out-of-specification, and cannot be used by the manufacturer or their customers without further correction and expense.

Further additional material generally can not be added to a cured undersized previously enhanced aperture. The material must be stripped before a greater amount of material can be attached to the part. Stripping fluoropolymer or other functional materials is extremely tedious, exacting and generally not economically feasible. Moreover, even if the material is easily removed from the parts, the part must be re-processed and recoated. This process is labor, material and time intensive which is cost prohibitive and inhibits just-in-time delivery. Further, some materials like fluoropolymer resins cannot be easily stripped once they are cured. Stripping the fluoropolymer resin may generate gases which are currently under study by entities who believe there is a high element of toxicity in over-cured or thermally-degraded fluoropolymer and other organic materials or coatings.

Manufacturers must address the above issues in an coordinated efficient manner. Accordingly, there is a need for a method for providing dimensionally corrected and functionally enhanced parts to manufacturers which accounts for the level and extent the manufacturer desires to have its parts simultaneously corrected and/or enhanced in compliance with both the dimensional specifications and the other functional requirements for the parts.

SUMMARY OF THE INVENTION

The method of the present invention provides manufacturers a plurality of options for and enables manufacturers to select how the manufacturers desire their parts to be measured, dimensionally corrected and functionally enhanced. For purposes of this application "manufacturer" includes manufacturers, suppliers, distributors, vendors, purchasers and assemblers of parts and their customers. The method generally includes: (i) offering the manufacturer a plurality of options for dimensionally correcting and functionally enhancing the manufacturers' raw parts; (ii) having the manufacturer select or provide the dimensions of the raw parts to correct and enhance from a population of raw parts provided by the manufacturer, select one or more portions or surfaces of each raw part to be dimensionally corrected and/or functionally enhanced, and select at least one or more materials to be used for dimensionally correcting and/or functionally enhancing the part; (iii) having the manufacturer provide the parts to the implementor of the method; (iv) dimensionally correcting and functionally enhancing such selected parts in accordance with the manufacturers' individually selected options; and (v) providing the dimensionally corrected and functionally enhanced parts to the manufacturer. Preferably, if possible, the implementor simultaneously dimensionally corrects and functionally alters the parts.

The first and second steps include a plurality of suboptions or selections for the manufacturer. For example, the manufacturer can select all the raw parts in a population of raw parts for enhancing or select only those raw parts that fall within a predetermined dimensional range. The manufacturer can also select the entire raw part for enhancing, a portion of the raw part, one surface of the raw part or multiple surfaces. The manufacturer is also provided with a number of options with regard to the materials to be used for enhancing and the number of layers of the materials.

It is therefore an object of the present invention to provide a method for providing dimensionally corrected and functionally enhanced parts to manufacturers.

A further object of the present invention is to provide manufacturers with a plurality of options for dimensionally correcting and functionally enhancing raw parts.

A further object of the present invention is to provide manufacturers with a plurality of options for selecting the parts, the portion of the parts and the materials to be used in dimensionally correcting and functionally enhancing raw parts.

Other objects, features and advantages of the invention will be apparent from the following detailed disclosure, taken in conjunction with the accompanying sheets of drawings, wherein like numerals refer to like parts, components and steps.

DETAILED DESCRIPTION OF THE INVENTION

The present invention is a method for providing dimensionally corrected and functionally enhanced parts to manufacturers. The implementor of the present invention provides manufacturers with a plurality of options for dimensionally correcting and functionally enhancing raw parts and enables the manufacturers to select the appropriate options. As further described below, the raw parts are dimensionally corrected and functionally enhanced by permanently coating, bonding, applying, attaching or otherwise affixing or adding a material to the specified areas or surfaces of the raw parts.

As discussed above, present manufacturing and machining methods generally are not one hundred percent accurate. Therefore, specification for parts include tolerances. The method of the present invention recognizes that parts within the dimensional range are preferable if they are dimensionally corrected and functionally enhanced to be as close to the DOTS as possible. The method also recognizes that some of the raw parts provided by manufacturers are outside of the tolerances (i.e., have a dimension smaller than a LSL limit or a dimension larger than a second or USL limit) and that certain of these parts can be simultaneously dimensionally corrected and functionally enhanced so that they are dimensionally usable, in specification and functionally optimized.

The function of the part may also be optimized through the selection of the proper enhancing material to be applied to the part. In the bushing example discussed above, a bushing used in a highly corrosive environment preferably includes an anti-corrosive coat. A bushing used with a moving part preferably includes an low friction anti-wear surface and a wear indicator. The present method enables the manufacturer to select the option of functionally enhancing the raw parts provided by the manufacturer in addition to dimensionally correcting the raw parts provided by the manufacturer to the implementor.

High Level Method Overview

Figure 1:
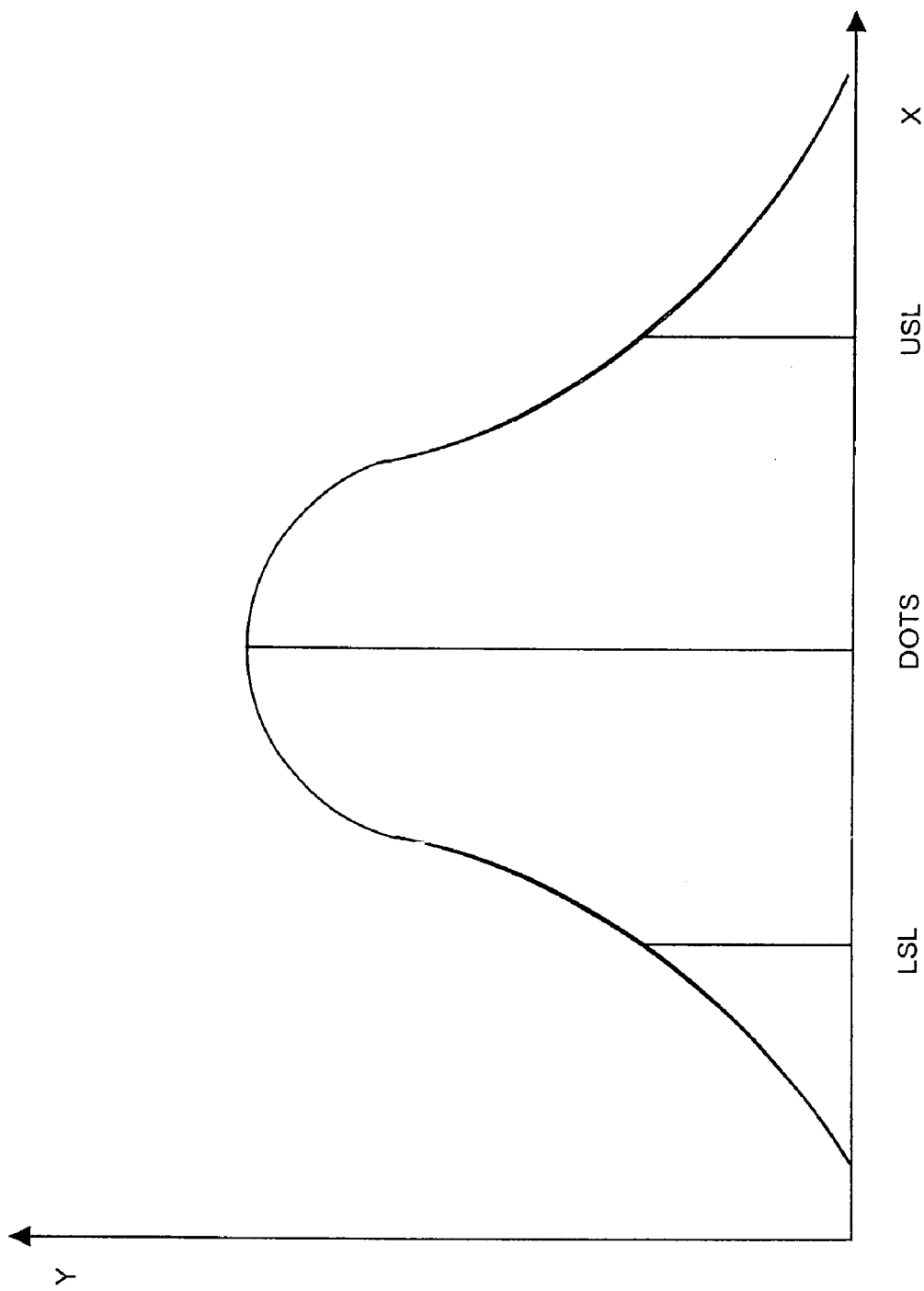
FIG. 1 is a sample distribution graph or bell curve representing the normal distribution of parts around a dimensional optimum target specification.
Figure 2:
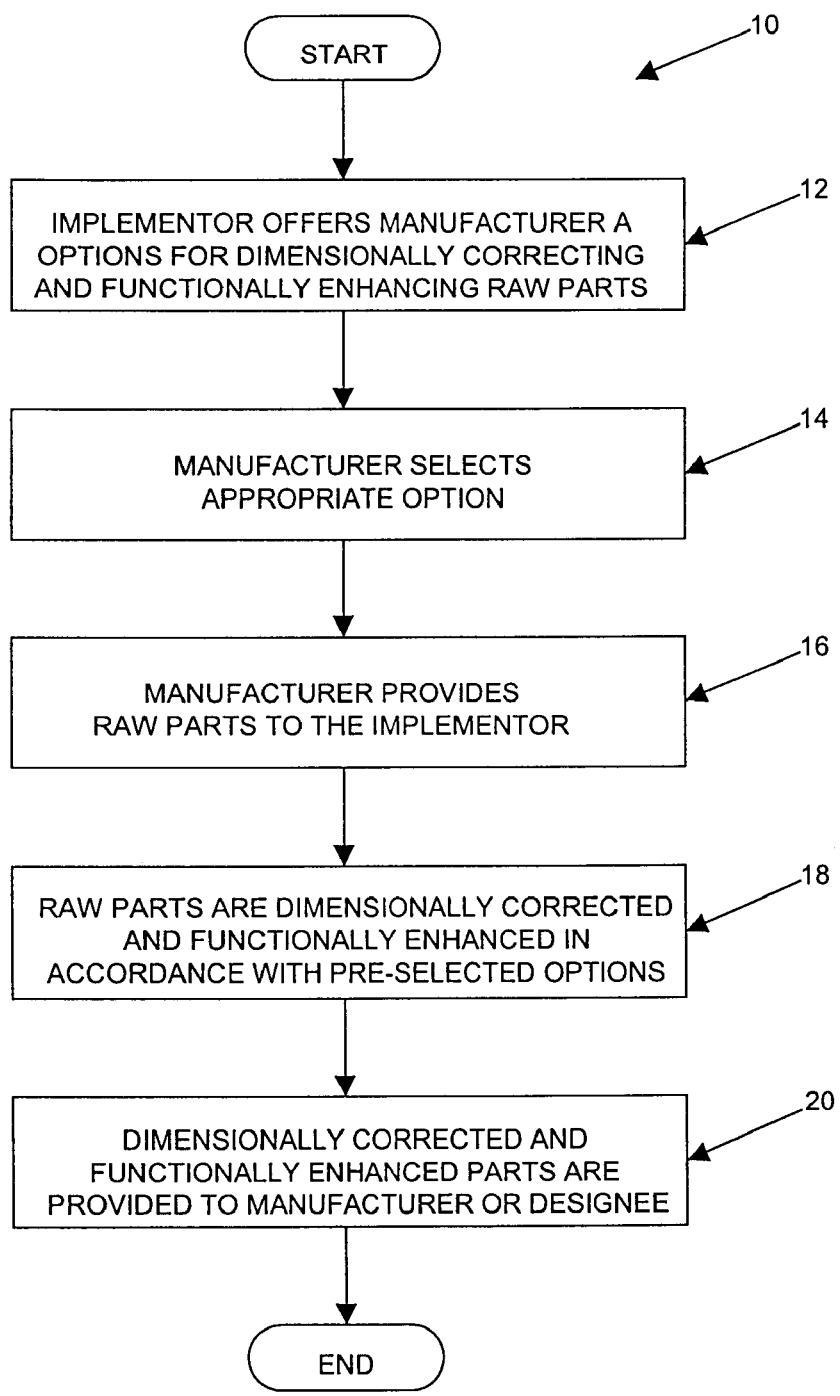
FIG. 2 is a high level flowchart of the method of the present invention.

Referring now to FIG. 2, the method for providing dimensionally corrected and functionally enhanced parts to manufacturers is generally designated by numeral 10. The implementor of the method provides or offers to the manufacturer the plurality of options for dimensionally correcting and functionally enhancing the raw parts, as indicated by block 12. The implementor may verbally communicate the options to the manufacturer or preferably provides the manufacturer with a written or electronic option form which enables the manufacturer to select the options desired by the manufacturer. The option form can be provided to or accessed by the manufacturer using any suitable communication means including enabling the manufacturer to select the options via a designated implementor URL through the internet. The implementor may assist the manufacturing in selecting the options. The manufacturer must select all of the options prior to the implentator beginning the process of dimensionally correcting and functionally enhancing the raw parts.

The manufacturer selects the appropriate options as indicated by block 14 and provides the raw parts to the implementor as indicated by block 16. The implementor dimensionally corrects and functionally alters the raw parts in accordance with the selected options using suitable raw and finished part measurement, material measurement, material application and material curing, coating or bonding devices and/or techniques as indicated by block 18. After the dimensionally correcting and functionally enhancing process is complete, the implementor provides the finished, dimensionally corrected and functionally enhanced parts to the manufacturer, the manufacturer's designee or the end user as directed by the manufacturer as indicated by block 20.

It should be appreciated that the thickness of the coating must be accommodated during the option selection process for the raw parts. It should also be appreciated that the method of the present invention enables the manufacturers to be purposely less stringent regarding the accuracy requirements for the tolerances of the raw parts during the manufacturing process, which saves the manufacturer substantial costs. For example, the manufacturer could use a drilled aperture instead of a reamed aperture or use standard tolerance tubing or bar stock instead of honed tubing or ground bar stock. It should be appreciated that the present invention enables the manufacturer to reduce or eliminate post finishing operations of the coated surface of the parts. For example, precision fit valve components do not need to be re-ground after coating.

General Implementor Options

Figure 3:
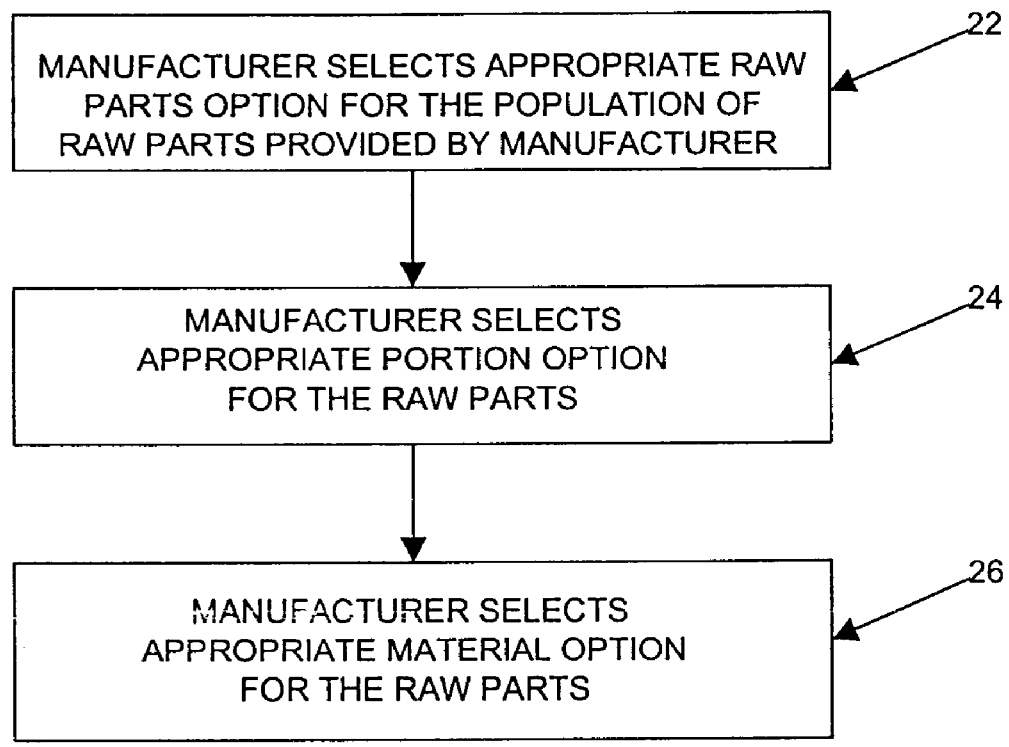
FIG. 3 is a high level flowchart of the options available for simultaneously dimensionally correcting and functionally enhancing the raw parts in accordance with the method of the present invention.

More specifically, referring now to FIG. 3, the implementor makes a plurality of options available to the manufacturer as indicated by block 12 of FIG. 2. These options include a raw parts option or dimensional segregation option, a portion or surface application area option and a material option. The manufacturer selects in advance the appropriate raw parts option for the population of raw parts provided by the manufacturer to the implementor as indicated by block 22. The manufacturer selects the appropriate portion option for each of the raw parts as indicated by block 24. The manufacturer also selects the appropriate material option as indicated by block 26.

Figure 4:
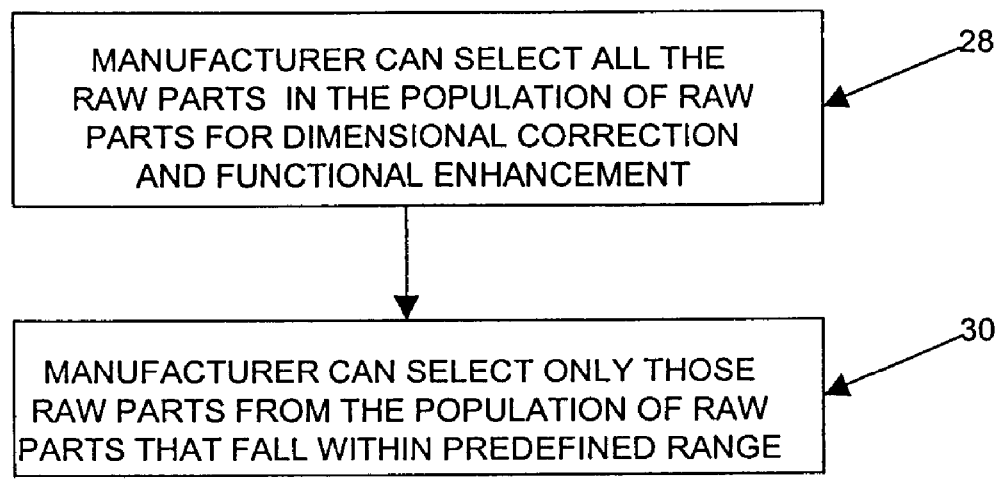
FIG. 4 is a flowchart of the raw parts option of the method of the present invention.

Options for Selection the Raw Parts to be Dimensionally Corrected and Functionally Enhanced More specifically, referring now to FIG. 4, the method 10 provides the manufacturer with a plurality of options for selecting how the implement will process the raw parts in the population of raw parts provided by the manufacturer to the implementor and how the implementor will dimensionally correct and functionally alter the raw parts. The method enables the manufacturer to: (i) select the option in which all the raw parts in the population of raw parts are dimensionally corrected and functionally enhanced as indicated by block 28; or (ii) select the option in which only those raw parts from the population of raw parts that fall within a dimensionally feasible predetermined range are processed as indicated by block 30.

In the first raw parts option, the manufacturer selects the option in which the manufacturer provides the implementor with a population of raw parts for correcting and enhancing, so that all the parts provided are enhanced (i.e., all the raw parts in the provided population are processed). In this case, the manufacturer has manufactured the parts within specification and wishes to optimize the appropriate dimension of the raw parts.

In the second raw parts option, the manufacturer selects the option in which the manufacturer provides all of the raw parts to the implementor and the implementor determines which parts fall within the predetermined range and dimensionally corrects and functionally enhances only those raw parts of the population of raw parts that fall within the predefined range as indicated by block 30. The manufacturer also selects the predefined ranges to be used by the implementor. In this option, the implementor gauges all of the raw parts of the population of raw parts and dimensionally corrects and functionally alters only those parts that fall within the predefined range (i.e., excludes those raw parts that exceed certain limits, such as the LSL or USL, or a special limit which would be even tighter or more selective on a dimensional basis). In this option, the parts that exceed the predefined limits are discovered through dimensional gauging and are set aside from the population of raw parts and will not initially be dimensionally corrected or functionally enhanced. The parts set aside, segregated or quarantined can be returned to the manufacturer or further processed, if feasible, as discussed below. The dimensionally corrected and functionally enhanced population will be diminished by the quantity of these parts that are initially segregated.

It is also contemplated that the manufacturer can choose the suboption wherein at least some of those parts that exceed at least one of the predefined limits can be corrected and enhanced. In the bushing example discussed above, the bushings having apertures that are too large (i.e., greater than the USL) may be dimensionally corrected in a single or multiple step process subsequent to the processing of the parts which fall with the initial processing range.

In a single step process, these segregated parts are dimensionally corrected by adding the appropriate material to the part in one step. In a multiple step process, after the parts are segregated from the initial dimension correcting phase, the segregated parts may need enhancing functional materials applied in more than one application to dimensionally correct the raw part. Using at least two applications, it is contemplated that a first or primer layer could be applied to the excluded or set aside parts, the primer could be underbaked or cured and the same top coat formulation could be applied to build up the thickness of the correcting or enhancing material sufficiently to allow these parts to be used in production. In other words, the method of the present invention enables the manufacturer to select the option in which those parts that exceed one pre-defined limit (i.e., are too large) can be dimensionally corrected and salvaged for the manufacturer, thus saving the manufacturer significant costs.

Those parts that exceed the other pre-defined limit, like the bushing discussed previously having an aperture that is too small, are not suitable for this method because these parts are already too small. Adding enhancing material would only make the inner diameter smaller. These parts are excluded from the population and returned to the manufacturer for discarding, further processing or machining that would enlarge the inner diameter by removing some material if desired by the manufacturer, thereby allowing the parts to be subsequently processed.

It should be well recognized by those skilled in the art that the above method is also suitable for parts having varying extension dimensions. For example, if the extension dimension of the bushing exceeds one predefined limit (i.e., is too small) the material may be applied to the outside of the part. However, if the part is too large, then the bushing may be excluded and returned to the manufacturer.

The method of the present invention thus enables the manufacturer to select the appropriate option of having an individually determined amount of a material bonded, coated or otherwise attached to the raw part to provide pre-calculated dimensional changes to the individual part. The manufacturer can thus selectively dimension or re-dimension the parts.

Figure 5:
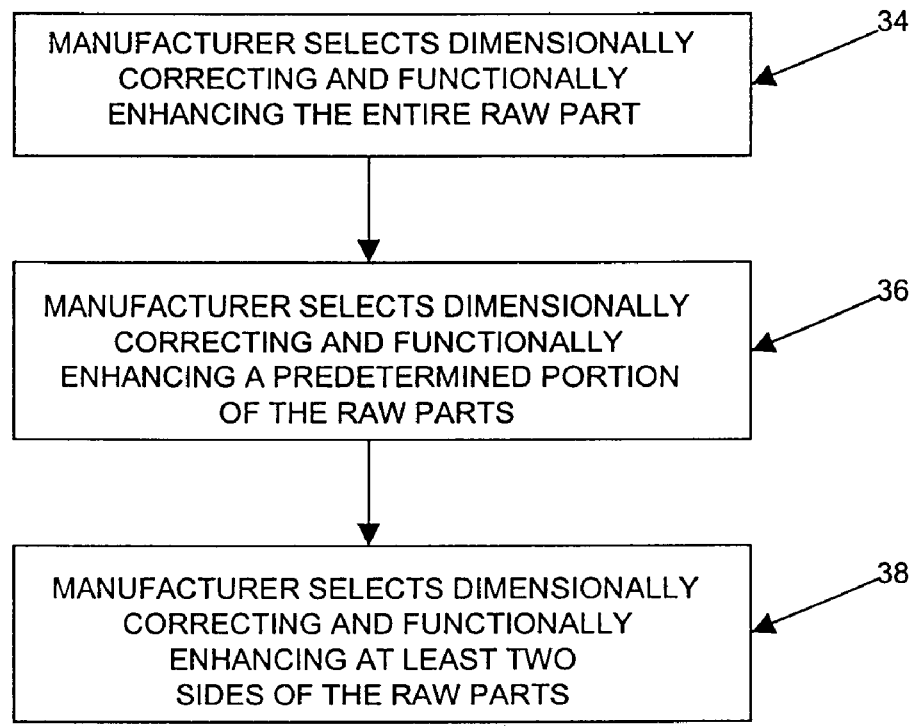
FIG. 5 is a flowchart of the portion option of the method of the present invention.

Options for Selecting the Dimensionally Corrected and Functionally Enhanced Portions of the Raw Part Referring now to FIG. 5, the method provides an option whereby the manufacturer can select the portions or surfaces of the raw part to be dimensionally corrected or enhanced. More specifically, the manufacturer can: (i) select the option to correct or alter the entire raw part as indicated by block 34; (ii) select the option to correct or alter only a predetermined portion or surface of each raw part as indicated by block 36; (iii) select the option to correct or alter all or part of at least two surfaces of the raw part and up to all the surfaces of the raw part, as indicated by block 38. For example, the manufacturer could select the option to functionally alter the part by applying material to prevent degradation due to corrosion, wear, dirt, abrasion, heat and pressure to the entire part and select the option to apply a low-friction material to only one surface of the part.

Only one portion of the raw part may need to be within specification. Therefore, the manufacturer may select the option where the implementor applies material to only that portion of the part to bring the entire part within specification. The manufacturer has the option to select two or more portions of the raw part if these portions need to be within specification. The manufacturer can select the option where the material is applied in a uniform layer, and subsequently supplied with a specified variable quantity to the predetermined portion of the part to bring that portion of the part within dimensional specification in addition to providing a coating for the other portions. The manufacturer can select the option wherein the enhanced part is provided to the manufacturer as is, or where a second uniform "final" layer is applied over the entire part including the dimensionally corrected portion. However, in applying a second layer, preferably a fixed quantity of a pre-determined thickness of material is applied.

Additionally, the manufacturer may select the option to apply the material to at least two sides, a separate inner and outer diameter, a top and bottom portion or opposing sides or isolated portion. The manufacturer can select the option to apply the material only to those sides that are subject to potential corrosion, abrasion, friction, etc.

For example, only one portion of the part may be exposed to other moving parts. In the bushing example provided earlier, the bushing may secure a moving cylinder, so that only the aperture of the bushing is exposed to wear. Therefore, the manufacturer can choose to apply an anti-wear coating to only the aperture which dimensionally corrects and functionally alters the aperture of the bushing. It should be appreciated that the manufacturer can select any option where the enhancing material is applied to the bushing in any combination discussed previously, for example, dimensionally correcting and functionally enhancing the aperture while functionally enhancing all or some of the other surfaces of the bushing. Thus, the part may be completely coated with one or more surfaces dimensionally corrected and functionally altered.

Furthermore, it is contemplated that the manufacturer may select the option where the material is not applied uniformly over that predetermined portion of the raw part to be bonded (i.e., a first part of the predetermined portion may require more material than a second part, so that the material may be applied in a variable amount). In the example discussed previously, one portion of the aperture of the bushing may be more out of spec than any other portion of the aperture. Therefore, the material may be applied in a variable amount, so that more material is applied to that first part of the aperture than any other portion.

Figure 6A:
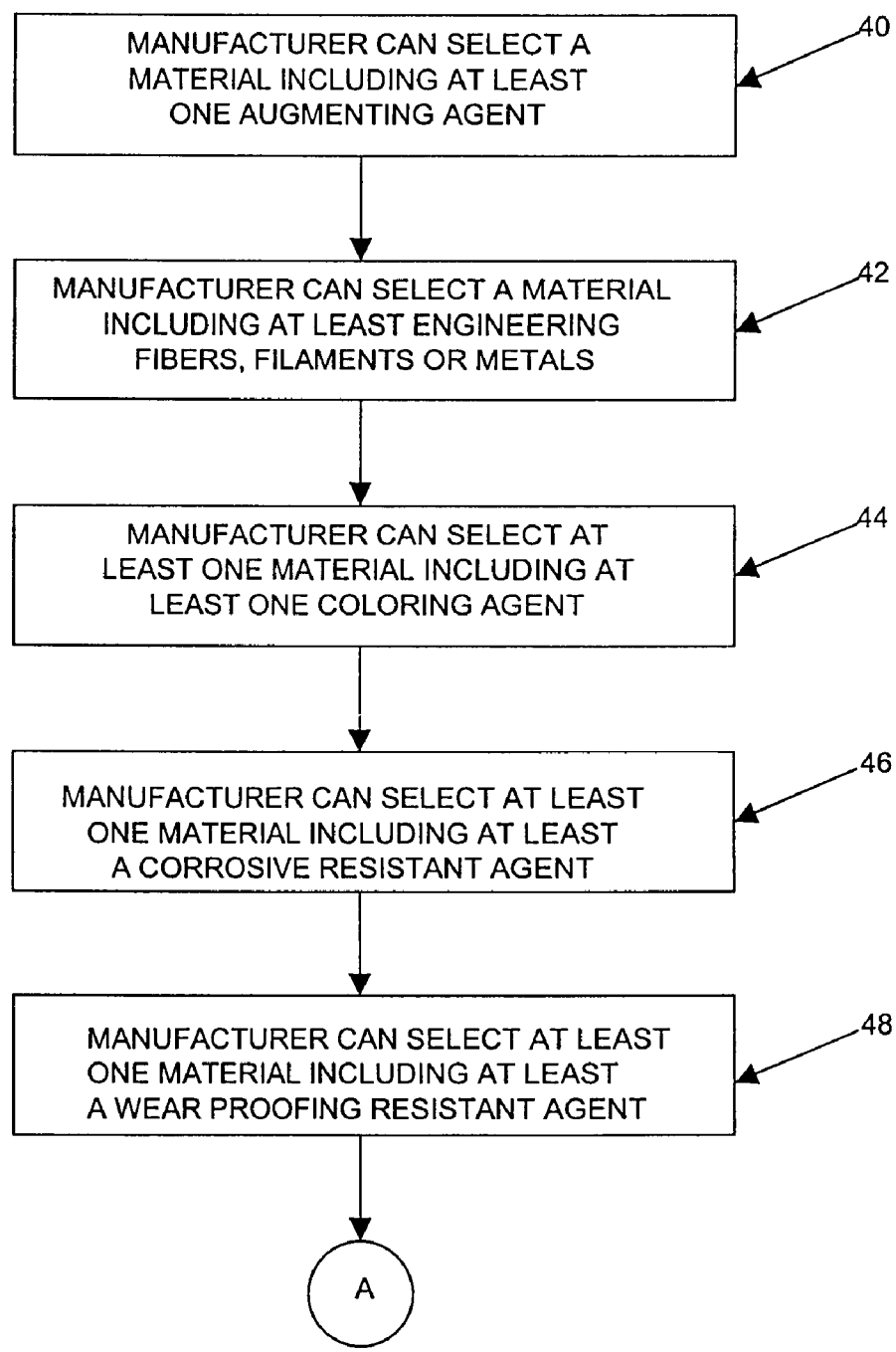
FIGS. 6A and 6B are flowcharts of the material option of the method of the present invention.
Figure 6B:
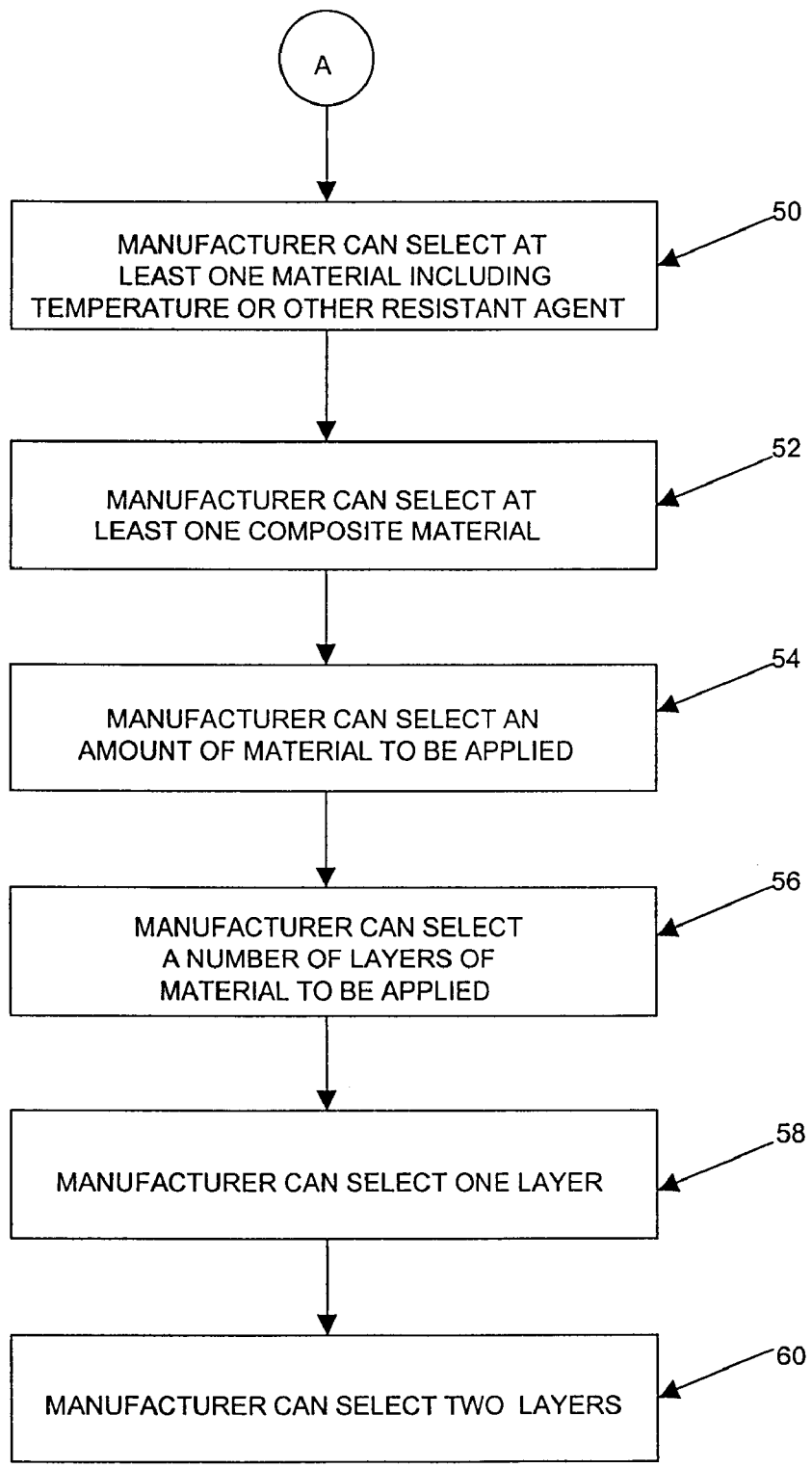

Options for Selecting the Materials for Dimensionally Correcting and Functionally Enhancing the Parts Referring now to FIGS. 6A and 6B, the method of the present invention provides options for the manufacturer to select the materials to be used as the correcting or enhancing material. The manufacturer has the option to select at least one material such as PTFE (Teflon®) or other suitable materials such as lower temperature cure resin formulations suitable for plastic parts. The manufacturer may also select the option to simultaneously or consecutively use two different materials to dimensionally correct and functionally alter the part.

Additionally, the manufacturer has the option of otherwise functionally enhancing the parts, including selecting material including at least one augmenting agent, as indicated by block 40, which includes but is not limited to engineering fibers, filaments or metals, as indicated by block 42. The manufacturer could select at least one selected material which includes at least one coloring agent as indicated by block 44, corrosive resistant agent as indicated by block 46, wear proofing resistant agent as indicated by block 48, temperature, pressure or other resistant agent as indicated by block 50, or some combination of these materials. It is further contemplated that the manufacturer could select material comprised of a single ingredient or a composite material as indicated by block 52.

The manufacturer may select the material option which further comprises selecting the amount of materials to be applied as indicated by block 54 and the number of layers of material to be applied as indicated by block 56. The manufacturer can select the amount of material to be applied using a number of different factors. For example, the manufacturer may specify the amount of material, or may provide their own requirements or an industry standard. In the later instance, the raw parts (or even a companion or mating piece) are measured and the amount of material is calculated based on the dimensional difference between the mating raw parts and the supplied requirements or standards. The manufacturer can select the option where the implementor supplies the manufacturer with pairs of parts where one or both of the parts are dimensionally corrected and functionally enhanced.

As provided earlier, after the manufacturer selects at least one of the plurality of options and provides the population of raw parts to the implementor, the raw parts are dimensionally corrected and functionally enhanced according to the options selected by the manufacturer. The implementor applies the selected materials in the selected amounts in the selected number of the layers to the predetermined portion of the raw parts selected from the population of raw parts. After dimensionally correcting and functionally enhancing the parts, the corrected and enhanced parts are provided to the manufacturer or other end user as specified by the manufacturer.

FIGS. 6A and 6B further indicate that the option of selecting the material includes selecting a number of layers of enhancing material to be applied as indicated by block 56. The manufacturer can select applying only one layer of material as indicated by block 58 or two layers as indicated by block 60. In selecting two layers, the manufacturer can select two layers comprised of the same material having the same functional requirement or different materials having different functional requirements. The manufacturer further can select sealing one or both layers.

EXAMPLE A

Raw parts such as turbine pump impeller parts comprised of glass-filled molded plastic are coated on at least two sides, for example the top and bottom of parallel faces, to tighten up the pump clearance, provide proper permanent lubrication, and anti-seize anti-wear characteristics. In one version of this application, the manufacturer has the option to select applying the material in a uniform layer to one side of the raw part, but the material is applied in a variable amount to the second side, where the variable amount is determined based on the initial dimensions of the part or a companion or mating piece.

EXAMPLE B

In this example, the raw turbine pump parts of Example A are measured and compared with some supplied standard or dimensional specifications. The amount of material applied to each of the sides is applied in a variable fashion so that the enhanced parts are centered in a housing after enhancing. This may be critical in some areas where the function of a part or the assembly relies on exact centering of the part.

EXAMPLE C

In this example, the manufacturer has the option to select two layers of material to be applied to the raw parts. The first applied enhancing material is selectively applied in a variable fashion over the predetermined portion of the raw part. The second applied layer includes an augmenting agent such as a compatible engineering plastic or resin which is bonded directly to the first layer. The second layer is however of a constant thickness.

This multi-layer capability augments the first layer with engineering fibers, filaments, metals and other agents which will reduce impact damage and raise the bulk strength of the first layer. The second coat will be of a compatible resin having differing properties from the first layer in that a lower friction version of compatible resin will be applied.

This stratification of layers is necessary when characteristics of dynamics of the mating part require, for instance, very low initial friction. This is not attainable if the implementor uses one coating that is filled with too many particles of wear reducing components that will actually increase the friction coefficient because they are harder than Teflon®.

EXAMPLE D

In this example, the manufacturer selects two coats of uniform thickness to be applied to the raw parts. The manufacturer selects materials including a different coloring agent so that the two layers are differently colored. Any abrasion or wear causes the first layer having a first color to wear away, exposing the second layer having a second color. Wear is indicated by viewing the exposed second layer. This enables the manufacturer or user to readily determine wear so that the part may be fixed or replaced.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A method for providing dimensionally corrected and functionally enhanced parts to a manufacturer, wherein each part has a dimensional optimal target specification for a designated portion of the part, an upper dimensional specification limit for said designated portion of the part, and a lower dimensional specification limit for said designated portion of the part, the method comprising:

offering the manufacturer a plurality of options regarding dimensionally correcting and functionally enhancing raw parts provided by the manufacturer, said options including a raw parts option, a portion option and a material option, wherein said raw parts option includes:

an option to select a population of the raw parts for dimensionally correcting and functionally enhancing without regarding to said upper dimensional specification limit for said designated portions of said raw parts or said lower dimensional specification limit for said designated portions of said raw parts, and an option to select only said raw parts for dimensionally correcting and functionally enhancing from said population of raw parts that fall within a predefined range of less than the upper dimensional specification limit for said designated portion and greater than the lower dimensional specification limit for said designated portion;

determining the options selected by the manufacturer;

applying said selected dimensionally correcting and functionally enhancing material to said designated portion of each of said selected raw parts using the selected material based on the raw parts option selected by the manufacturer; and providing the dimensionally corrected and functionally enhanced parts to the manufacturer.

2. The method of claim 1, wherein said portion option includes:

(i) an option to select all portions of said raw parts for dimensionally correcting and functionally enhancing;

(ii) an option to select only said designated portion of said raw parts for dimensionally correcting and functionally enhancing; and (iii) an option to select at least two portions including said designated portion of each said selected raw parts for dimensionally correcting and functionally enhancing.

3. The method of claim 1, wherein said material option includes:

(i) an option to select at least one material including at least one augmenting agent;

(ii) an option to select at least one material including at least engineering fibers, filaments or metals;

(iii) an option to select at least one material including at least one coloring agent;

(iv) an option to select at least one material including at least a corrosive resistant agent;

(v) an option to select at least one material including at least a wear resistant agent;

(vi) an option to select at least one material including at least a temperature resistant agent;

(vii) an option to select at least one material including at least one pressure resistant agent; and (viii) an option to select at least one composite material.

4. The method of claim 3, wherein said material option includes an option to predetermine the amount of material to be applied to said parts.

5. The method of claim 4, wherein said amount of said material to be applied is determined by requirements supplied by the manufacturer.

6. The method of claim 4, wherein said amount of said material to be applied is determined by an industry standard.

7. The method of claim 3, wherein said material option includes an option to select a number of layers of said functionally enhancing material to be applied.

8. The method of claim 7, wherein said material option includes an option to select only one layer of said functionally enhancing material.

9. The method of claim 7, wherein the material option includes an option to select at least two layers of said functionally enhancing material.

10. The method of claim 9, wherein said at least two layers are comprised of a material having different functional characteristics.

11. The method of claim 9, wherein said at least two layers are comprised of a same material having the same functional characteristic.

12. A method for providing dimensionally corrected and functionally enhanced parts to a manufacturer, wherein each part has a dimensional optimal target specification for a designated portion of the part, an upper dimensional specification limit for said designated portion of the part, and a lower dimensional specification limit for said designated portion of the part, the method comprising the steps of:

offering the manufacturer a plurality of options for dimensionally correcting and functionally enhancing the raw parts provided by the manufacturer, said options including:

a raw parts option which includes: (i) an option to select a population of raw parts for dimensionally correcting and functionally enhancing without regard to said upper dimensional specification limit for said designated portions of the parts or said lower dimensional specification limit for said designated portions of the parts, and (ii) an option to select only said raw parts from said population of raw parts for dimensionally correcting and functionally enhancing that fall within a predefined range; of less than the upper dimensional specification limit for said designated portion and greater than the lower dimensional specification limit for said designated portion;

a portion option which includes: (i) an option to select all portions of said raw parts for dimensionally correcting and functionally enhancing, (ii) an option to select only said designated portion of said raw parts for dimensionally correcting and functionally enhancing, and (iii) an option to select at least two portions including said designated portion of each said selected raw parts for dimensionally correcting and functionally enhancing; and a material option which includes: (i) an option to select at least one material including at least one augmenting agent, (ii) an option to select at least one material including at least one coloring agent, (iii) an option to select at least one material including at least a corrosive resistant agent, (vi) an option to select at least one material including at least a wear resistant agent, (v) an option to select at least one material including at least a temperature resistant agent, (vi) an option to select at least one material including at least one pressure resistant agent, and (vii) an option to select at least one composite material;

determining the options selected by the manufacturer;

applying said selected dimensionally correcting and functionally enhancing material to said selected portions including said designated portion of each of said selected raw parts using the selected material based on the options selected by the manufacturer; and providing the dimensionally corrected and functionally enhanced parts to the manufacturer.

13. The method of claim 12, wherein said material option includes selecting at least one material including at least engineering fibers, filaments or metals.

14. The method of claim 12, wherein said material option includes determining an amount of said material to be applied.

15. The method of claim 14, wherein said amount of said material to be applied is determined by requirements supplied by the manufacturer.

16. The method of claim 14, wherein said amount of said material to be applied is determined by an industry standard.

17. The method of claim 14, wherein said material option includes the option to select a number of layers of said enhancing material to be applied.

18. The method of claim 17, wherein said material option further includes an option to select only one layer of said enhancing material to be applied.

19. The method of claim 17, wherein said material option further includes an option to select at least two layers of said enhancing material.

20. The method of claim 19, herein each of said at least two layers are comprised of a different material having different functional requirements.

21. The method of claim 19, where in each of said at least two layers are comprised of a same material having the same functional requirement.

* * * * *